April 25, 1950     A. B. NEWTON     2,505,255
TEMPERATURE CONTROLLER
Filed Nov. 4, 1943
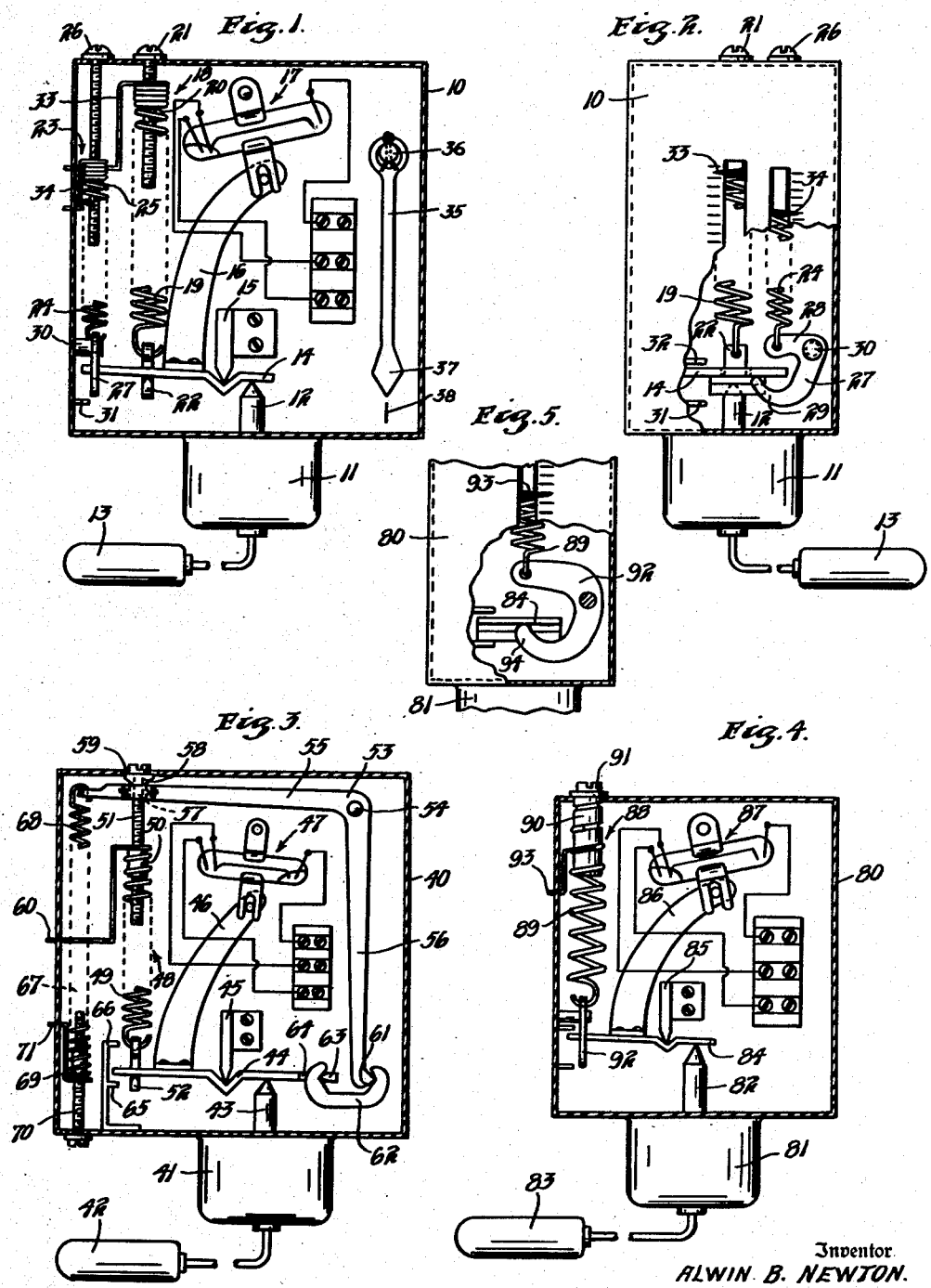
Inventor.
ALWIN B. NEWTON.
By George H. Fisher
Attorney Patented Apr. 25, 1950

2,505,255

UNITED STATES PATENT OFFICE 2,505,255

TEMPERATURE CONTROLLER

Alwin B. Newton, Minneapolis, Minn., assignor to Minneapolis-Honeywell Regulator Company, Minneapolis, Minn., a corporation of Delaware Application November 4, 1943, Serial No. 508,935

10 Claims. (Cl. 74—100)

1

Temperature controllers actuated by a bellows and connected bulb filled with a volatile fluid have long been used and have given comparatively good satisfaction over relatively short ranges of temperature. However, such devices have not been used for long range temperature controllers because of the considerable variation in differential occasioned by the action of the bulb and bellows system. The pressure exerted by a bellows and bulb arrangement filled with volatile fluid does not vary in straight line relationship with the temperature. With a particular bulb and bellows means, the pressure rise, or the force exerted by the bellows, varies at the low end of the temperature scale by relatively small amounts as the temperature changes; whereas at the upper end of the range of the device, the force exerted by the bellows increases considerably with like changes in temperature. This action tends to give wider operating differentials at the bottom of the range of a temperature controller than at the top. Such an arrangement is inherently bad for cooling conditions, for in cooling, the higher temperatures represent light loads and the lower temperatures represent heavier loads; therefore, with the temperature controller acting as above outlined, short cycling would occur at the upper end of the range of the controller and undue variations in temperature would occur at the lower end of the range. Obviously, the more the range of the instrument is extended, the more troublesome this condition becomes.

In the past, this difficulty has been minimized by using only a comparatively short portion of the potential range of the instrument to thereby minimize the change of differential. This has been acceptable because, in both heating and cooling, the temperature range used has been comparatively small. Lately however, in test chambers and the like, it has become necessary to control temperatures over a very extended range and it is therefore necessary, in order to minimize the number of controllers used, to extend the usable range of a single temperature controller.

It is therefore an object of the present invention to provide a long range temperature controller actuated by a bellows and bulb system.

It is an object of this invention to provide a control device responsive to temperature wherein the operating differential may be maintained reasonably uniform throughout a wide range of temperature variation.

It is a further object of the present invention

2 to extend the range of a temperature controller by controlling the variation in differential of said controller.

It is also an object of the present invention to extend the range of a temperature controller by increasing the rate of the forces opposing the action of the bellows as the control point is adjusted upwardly.

It is a further object to control the differential change in a temperature controller by increasing the rate of forces opposing the bellows and supplementing same by friction.

It is an additional object to minimize the differential change in a temperature controller by compensating for the change in rate of the force exerted by the bellows by changing the rate of the means opposing said bellows as adjustments of the controller are tightened.

It is an object to provide compensating means to modify the operating differential of controls in a desired manner to achieve desired results.

It is an additional object to provide a temperature controller for cooling wherein the differential at the upper end of the scale is greater than at the lower end of said scale.

It is a further object of the present invention to provide a temperature controller having an extended range which resembles, as nearly as possible, conventional controllers so that the manufacturing and tooling costs may be kept at a minimum.

These and other objects will become apparent upon a study of the following specification and drawing in which:

Figure 1 is a side elevation of a temperature controller of the sort described, housing parts being in section.

Figure 2 is an end elevation of the controller of Figure 1, a portion being broken away to show the internal construction.

Figure 3 is a side elevation of a modified temperature controller, housing parts being in section.

Figure 4 is a side elevation of a further modified temperature controller, with housing parts in section.

Figure 5 is a partial end elevation of the controller of Figure 4, a portion being broken away to show the internal construction.

The temperature controller of Figures 1 and 2 comprises a housing 10 having attached at its bottom portion, a bellows device 11 with an actuating member 12. Connected in sealed relation with bellows 11 is bulb 13 which contains a fill of volatile fluid, said bulb 13 being the temperature sensitive element of the device. Actuating member 12 coacts with lever 14, which fulcrums about member 15. Attached to lever 14 is arm member 16 which actuates mercury switch 17.

The force exerted on lever 14 by member 12 is resisted by two spring means which resist the action of the bellows device, one of the spring means, 23, being operable through a pivoted lever in frictional contact with the tilting lever means associated with the bellows device. The other spring means, 18, includes a coiled tension spring 19. A threaded plug 20 in one end of the spring 19 coacts with adjusting screw 21, and the other end of spring 19 coacts with lever means 14 through pivot member 22. Supplementing the action of spring means 18 is said spring means 23 comprising a coiled tension spring 24. A threaded plug 25 in one end of spring 24 coacts with adjusting screw 26 and the other end of said spring 24 is attached to arm 28 of lever 27. Lever 27 comprises said arm 28 and another arm 29 which frictionally contacts the underside of one end of lever 14, when so adjusted. Lever 27 is pivoted about means 30.

The motion of lever 14 is limited by bottom stop 31 and upper stop 32. The adjustments of spring means 18 and 23 are indicated by means 33 and 34 respectively.

The mercury switch 17 has an inherent operating differential that may be defined as the difference in angular degrees between the position in which the mercury will run to one end of the tube and the position in which it will return to the first end of the tube. Likewise the actuating member 16 must be moved through a predetermined angle to effect movement of the switch 17 through its differential. The difference in pressure within the bellows chamber 11 necessary to move the switch 17 through its differential will depend on the total effective spring rate plus the frictional drag between the arm 29 and the lever 14. If both springs 18 and 23 are acting on the lever 14 the spring rate will remain constant regardless of the adjustment of spring tensions, but the frictional drag between the arm 29 and the lever 14 will be proportional to the tension of spring 23. Hence the difference in pressure in the bellows 11 necessary to actuate the switch 17 through its operating differential will increase if the screw 26 is adjusted to tighten the spring 24, and will decrease if the tension of that spring is reduced.

As different types of fills for the temperature sensitive bulb 13 have different temperature-pressure characteristics, the comparative rates of springs 19 and 24 will depend on the differential characteristics desired and the type of fill used. Further, it is contemplated that more than two springs may be used and the scale may be divided into more than two portions, the above example being but one of many feasible arrangements within the scope of this invention.

An arm 35 is loosely suspended from a pivot 36 near the upper end of the housing 10 and is provided with a pointer 37 at the bottom thereof cooperating with a mark 38 on the back of the housing for the purpose of indicating when the instrument is in a proper vertical position so that the mercury switch 17 used will function correctly.

*Operation of Figures 1 and 2*

With the parts of the temperature controller associated as above described, and assuming for the purpose of this description, that the bulb and bellows 13 and 11, respectively, are adapted for operation for a range of temperatures from −100 to +50. The spring means opposing bellows 11 may be adjusted so that spring means 18 is effective throughout the range of the instrument and spring means 23 is effective only through the upper portion of the range of the instrument, the particular division of the range being a matter of choice, and influenced by the spring rates, the type of fill used, and other such factors. With only spring means 18 effective during the lower portion of the range of the instrument, the minimum adjustment of spring means 18 may be assumed to be at the point −100. The upper limit of the adjustment of spring means 18 may be placed at −20; therefore spring means 18 alone may be adjusted to take care of any control point in the temperature range of −100 to −20. The control point is raised in this lower portion of the range by increasing the tension of spring means 18. While spring means 18 is being used for control points in the range of −100 and −20, spring means 23 is so adjusted that arm 29 of lever 27 is out of contact with member 14.

As the control point is raised above −20, the adjustment of spring means 18 is left at its −20 position and spring means 23 is adjusted to bring arm 29 of lever 27 into engagement with lever 14. By tightening spring means 23, arm 29 supplements the action of spring means 18 and permits raising the control point to the upper limit, +50°, of the instrument described. Note that only spring means 18 is used for the lower portion of the range of the instrument and spring means 18 plus spring means 23 is used for the upper portion of the range, all of the adjustments for said upper portion being on spring means 23. In addition to the supplementary force of spring means 23 acting through arm 29 of lever 27, friction between arm member 29 and member 14 resists movement of arm 14 in either direction and tends to widen the operating differential. This friction increases as spring means 23 is tightened, thus the effect of friction on the differential is increased as spring means 23 is adjusted for higher control points. Obviously, the coefficient of friction of the friction surfaces influences the magnitude of the effect of said friction on the differential but, as a practical matter, the coefficient is kept reasonably low by smoothly finishing said surfaces, this being necessary to avoid erratic operation and for uniformity in manufacturing.

With spring means 18 only opposing the action of bellows 11, the operating differential narrows to some extent as the control point is adjusted upwardly by tightening spring means 18. When spring means 18 is supplemented by spring means 23, the operating differential is widened, but as the control point is further raised, the operating differential again tends to narrow. However, as before stated, the force of spring means 23 is exerted through arm 29 to member 14, and the friction due to the engagement of same tends to retard movement and thereby increases the differential with a net result that the operating differential may be kept reasonably uniform or, depending on the comparative spring rates and the fill used, actually increased as the control point is adjusted upwardly. There is thus provided a temperature controller capable of operating over a long range. Further, the present controller gives superior results for cooling service by widening the operating differential at the upper end of the scale and thus preventing short cycling. The ability to control the change of differential also makes possible the narrowing of the differential in the lower ranges of the scale and still maintain a workable differential at the upper end of the scale. The improvement made possible in the lower ranges of the control scale is of utmost importance for it permits better running conditions for the refrigerating apparatus and the maintaining of more uniform temperatures.

Figure 3

In Figure 3 is shown a modified long range temperature controller actuated by a volatile fluid filled bulb and bellows assembly such as previously described. Bellows device 41 has an operating member 43 which bears against fulcrumed member 44. Member 44 pivots about fulcrum 45 attached to housing 40. Attached to member 44 is arm member 46 which operates mercury switch means 47. The force exerted on member 44 by operating means 43 of bellows 41 is resisted by spring means 48, said means comprising a coil spring 49. A plug 50 is fitted in one end of said spring 49 and an adjusting screw 51 is threaded into said plug. An anchor means 52 coacts with member 44 and the other end of said spring 49.

Adjusting screw 51 coacts with lever member 53 pivoted to housing 40 by means 54, said lever 53 having a horizontal arm 55 and a vertical arm 56. The adjusting screw 51 extends through a hole 57 in arm 55 and the head of said screw bears against a pivot member 58 which coacts with the upper side of said arm 55. A hole 59 is provided in housing 40 to permit access to the head of said screw 51 to permit movement of said head relative to said housing. The adjustment of spring means 48 is indicated by pointer means 60 which extends out through housing 40 in the conventional manner. Said pointer 60 includes an offset portion to avoid spring means 67, to be described. At the lower end of arm 56 is provided a pivot portion 61 which coacts with a link 62, said link 62 extending through an opening 64 in member 44 in pivotal relation to a sharpened edge portion 63. Pivot portions 61 and 63 are preferably arranged to be in alignment with member 44 when the left end of member 44 approaches bottom stop means 65 and switch 47 is in a position to break a cooling circuit or the like. Scale adjustments are made and read when the parts are in the positions shown, uniformity in this matter being desired because of the slight movements of 60 due to movement of member 53 and spring means 48, as the bellows contracts and expands. Pivots 61 and 63 may also be arranged to align with 44 when said member 44 is in an intermediate position between the stops or may align with 44 when the left end of same approaches the upper stop and switch 47 is in cooling circuit making condition. These various arrangements of pivots 61 and 63 have little effect on the rate of change of the operating differential although they may affect the amount of differential.

A differential control comprises adjustable spring means 67 which consists of a tension spring 68 secured at one end to the extreme left end of horizontal arm 55; a plug 69 being fitted in the other end of said spring. An adjustable screw means 70 coacting with housing 40 is threaded into said plug 69 and furnishes means for adjusting the tension of said spring. Pointer means 71, associated with said plug 69, extends through housing 40 to indicate the adjustment of spring means 67.

Operation

In operation, with only spring means 48 opposing the action of member 43 of bellows 41, the operating differential of the instrument would tend to become narrower as the control point is raised by tightening adjusting screw 51. This narrowing of the operating differential would be due to the action of the fill in the bulb and bellows arrangement, as previously described. However, adjusting screw 51 coacts with pivoted arm member 53, and a counterclockwise force is exerted at pivot portion 61 of arm 56 when the adjusting screw 51 is tightened. This counter clockwise force, so long as it is exerted in alignment with member 44, has no effect on the force required by member 43 to operate said member 44. In the position shown of the parts, an unsatisfied cooling condition is indicated, and the pressure is high in bellows 41. As conditions of cooling become satisfied, and the pressure decreases in 41, spring means 48 tends to cause clockwise rotation of member 44. This clockwise rotation is resisted by member 43 of bellows 41 and is also resisted by the action of arm 56 and link 62. Because of the assistance of arm 56 and link 62 in resisting the clockwise motion of member 44, the pressure exerted by bellows 41 may diminish more than otherwise. As the adjusting screw 51 is tightened for higher control points, the effect of arm 56 and link 62 upon member 44 increases, thus permitting a greater difference in pressure in bellows 41 between satisfied and unsatisfied condition as control points are raised upwardly. As previously noted, the pressure difference caused by bellows 41 and its associated bulb for units of temperature change, increases as the control points are raised; hence, it becomes necessary to provide for greater pressure differences in the instrument at higher control points if a reasonable and constant operating differential is to be maintained, or if the differential is to be widened at the upper control points. As the instrument just described requires greater pressure differences for operation at higher control point adjustments, it provides the necessary modification of differential for a practical instrument. It is noted that compensation is provided throughout the entire range of the instrument in this modification; hence, the present instrument not only has desirable differential characteristics but may also be developed to use the full potentialities of the temperature sensitive means.

Upon adjusting the tension of spring means 67 by tightening adjusting screw 70, the effect of arm 56 and link 62 on member 44 may be increased and the operating differential thus further modified. Tightening screw 70 has the same effect on the operating differential as tightening adjusting screw 51 but note that in this case only the differential is changed whereas when screw 51 is adjusted, both the differential and control points are altered. Pointer 71 indicates the adjustment of the differential and pointer 60 indicates the adjustment of the control point.

Figures 4 and 5

Figures 4 and 5 show a further modified long range temperature controller comprising a housing 80, to which is attached a bellows 81, said bellows having an operating member 82. Bellows 81 is actuated by connected bulb 83 filled with a volatile fluid. Member 82 coacts with fulcrumed lever 84, which pivots about fulcrum member 85. Member 84 has attached thereto, arm 86 which operates mercury switch means 87. The action of operating member 82 of bellows 81 is resisted by spring means 88 comprising a coil spring 89 and a rotatable, spirally grooved member 90, said member 90 being rotated by means 91. Spirally grooved member 90 is threaded into one end of spring 89 and may be adjusted to pull same upwardly and tighten same. In addition to tightening said spring 89, the effective length of the spring is lessened, thus its rate is increased. Adjustment indicating means 93, similar to 33 and 34 of Figures 1 and 2, is attached to the upper end of spring 89, and not only indicates said adjustment but also restrains twisting of said spring, due to friction between said spring and rotatable member 90, while adjustments are being made.

The other end of the spring 89 coacts with lever means 92, similar to lever means 27 of Figure 2. Lever means 92 frictionally coacts with member 84 in the same manner as 27 of Figure 2, through contact portion 94, whereby the frictional effect of member 92 relative to member 84 is increased as spring means 88 is adjusted for higher control points.

*Operation*

In operation, at low control points, spring means 88 is relatively loose, and due to the low pressure, there is little friction between member 92 and member 84 and member 82 may operate 84, 86 and mercury switch 87 with a predetermined operating differential. As the control point is raised by adjusting means 91, spirally grooved member 90 is threaded into spring 89 and tightens same. The tendency of spring 89 to twist as spirally grooved member 90 is threaded thereinto is resisted by indicating means 93 which is attached to the upper end of said spring 89. In addition to tightening the spring, the effective length of spring 89 is lessened, as previously noted. The increase in spring rate occasioned by shortening the effective length of the spring offsets the increased rate of pressure build-up in bellows 81 as temperatures are increased, and thereby tends to maintain a uniform operating differential, or one having other desired characteristics. In addition, friction between member 92 and member 84 increases as the tension of spring 89 is increased and this increase in friction, in conjunction with the increased spring rate, tends to provide wider differentials as the control point is raised. A judicious choice of the spring used and the pitch of member 90 permits suitable control of the differential characteristics including a diminished rate of change of differential, a uniform differential or an increasing differential as control points are raised. The friction surfaces may also be altered to change the differential characteristics but it is generally desirable that such surfaces be uniformly smooth.

By thus providing a controller wherein the forces opposing the operating member of a bulb and bellows assembly are increased in a manner to compensate for the increased rate of pressure rise in the bellows assembly as the control point of temperature is increased, it becomes practical to use such a controller over a wide range of temperature. The maintenance of a reasonably uniform operating differential makes the instrument effective as a cooling control but the actual widening of the differential with higher control points is often still more desirable for cooling control means.

In each of the examples shown, it is seen that the increased rate of pressure build-up in a bulb and bellows operated temperature controller can be offset, or the effects of same modified, by opposing the action of said bulb and bellows arrangement with force exerting means having a variable rate. In addition to greatly extending the range of operation of such a temperature controller, superior operating characteristics of cooling equipment also results. The ability to use a reasonably narrow differential at the lower ranges of the controller permits the maintaining of reasonably uniform temperatures, whereas the preventing of undue narrowing of the differential as the control temperatures are raised, prevents the unduly rapid stopping and starting of the equipment known as "short cycling."

It is also contemplated that the present means for modifying the operating differential of temperature controllers, limit controls or the like, may be used with condition responsive means other than bulb and bellows devices. In controllers using an expanding fluid, solid, or other temperature responsive means, the present invention may be used to provide suitable differential characteristics, especially for cooling, wherein the differentials are preferably relatively wide at the upper end of the scale and relatively narrow at the lower end of said scale.

Because the present means permits considerable control of differentials, it becomes more feasible to use vacuum fills in bulb and bellows devices than previously. The use of such fills has been limited in the past due to the considerable rate of change of pressure relative to temperature changes. Now, the safety features of such fills may be enjoyed while desirable operating characteristics of the controlled equipment are maintained.

The above examples of the present invention are intended to be illustrative only and are not to be considered in a limiting sense, the scope of the invention being determined by the following claims.

I claim as my invention:

1. In a pressure responsive device, in combination, means defining an expansible chamber, a member positioned by said chamber, control means actuated between two operative positions by said member, a spring acting on said member in opposition to the force due to the expansible chamber, differential determining means responsive to the force of said spring applying a further force on said member tending to resist movement thereof in either direction, between positions corresponding to the two operative positions of said control means and means for adjusting said spring to vary the force applied to said member and to said differential determining means by said spring.

2. In a pressure responsive device, in combination, means defining an expansible chamber, a member positioned by said chamber, control means operated by said member or movement thereof between two predetermined positions, a spring acting on said member between the predetermined positions in opposition to the force due to said expansible chamber, differential determining means acted on by said spring applying a further force on said member tending to resist movement thereof between the limits of the range of movement when moved in either direction, and means for adjusting said spring to vary the force applied to said member by said spring and to vary simultaneously the effect of said differential determining means on said member.

3. In a pressure responsive device, in combination, means defining an expansible chamber, a first lever positioned by said chamber, control means operated by said first lever, a second lever adapted frictionally to engage said first lever, said levers being pivoted on separate axes disposed to cause substantial relative movement between the points of contact between said second lever and said first lever on movement of said levers, a spring for biasing said second lever into engagement with said first lever, and means for adjusting the biasing force of said spring for determining the differential between the forces supplied by said chamber necessary to move said levers in opposite directions.

4. In a pressure responsive device, in combination, means defining an expansible chamber, a first lever positioned by said chamber, control means operated by said first lever, a second lever adapted to engage said first lever to oppose expansion of said chamber, a spring for biasing said second lever into engagement with said first lever, said second lever being pivoted on an axis disposed to cause substantial relative movement and a resulting frictional drag between the points of contact between said second lever and said first lever as said first lever is moved, and means for adjusting the biasing force of said spring for determining the total force that must be applied by said chamber as well as the differential between the forces supplied by said chamber necessary to move said levers in opposite directions.

5. In a pressure responsive device, in combination, means defining an expansible chamber, a first lever positioned by said chamber, control means actuated by the two operative positions by said member, a second lever adapted frictionally to engage said first lever, said levers being pivoted on separate axes disposed to cause substantial sliding movement between the points of contact between said levers on movement thereof, a spring for biasing said first lever into engagement with said second lever, means for adjusting the biasing force of said spring, a second spring acting on said member and tending to cause collapse of said expansible chamber, and means for adjusting the force applied by said second spring.

6. In a pressure responsive device, in combination, means defining an expansible chamber, a member positioned by said expansible chamber, control means actuated between two operative positions by said member on movement thereof through a predetermined range, a first spring opposing movement of said member by said expansible chamber throughout the range of movement, means for adjusting the force of said first spring, a second spring adapted to act on said member to resist movement thereof in either direction throughout the range of movement of said member in moving said control means between said two operative positions, and means for disengaging said second spring from said member.

7. In a pressure responsive device, in combination, means defining an expansible chamber, a member positioned by said chamber, control means operated by said member on movement thereof through a predetermined range, a spring acting on said member throughout the predetermined range of movement in opposition to the force due to said expansible chamber, a link having a first pivot in said member and a second pivot that lies in a plane at right angles to the direction of movement of the first pivot when said member is at one point in its range of movement, means interconnecting said link and said spring whereby said spring biases the second pivot of said link in that plane, and means for adjusting said spring to vary simultaneously the force applied to said member and to said link by said spring.

8. In a pressure responsive device, in combination, means defining an expansible chamber, a member positioned by said chamber, control means operated by said member on movement thereof through a predetermined range, a spring acting on said member throughout the predetermined range of movement in opposition to the force due to said expansible chamber, a link pivoted in said member and having a second pivot biased by said spring, said spring biasing said member through said link to a position in which said control means is positioned within said predetermined range, and means for adjusting the force of said spring.

9. In a pressure responsive device, in combination, means defining an expansible chamber, a member positioned through a predetermined range of movement by said chamber, control means operated by said member, a spring having a first end connected to said member for directly opposing movement thereof by said chamber, and having a second end operatively connected to a link and adapted, through said link, to bias said member to one point in its range of movement, and means for adjusting the force of said spring.

10. In a pressure responsive device, in combination, means defining an expansible chamber, a member positioned by said chamber, control means operated by said member, a lever adapted frictionally to engage said member, said lever being pivoted on an axis disposed to cause relative movement between the points of contact between said lever and said member on movement of said lever, a spring for biasing said lever into engagement with said member, and means for adjusting the biasing force of said spring and for simultaneously changing the effective length of said spring.

ALWIN B. NEWTON.

REFERENCES CITED

The following references are of record in the file of this patent:

UNITED STATES PATENTS

| Number | Name | Date |
| --- | --- | --- |
| 1,023,480 | Beck et al. | Apr. 16, 1912 |
| 1,492,312 | Penn | Apr. 27, 1924 |
| 1,618,963 | Knaak | Feb. 22, 1927 |
| 1,651,629 | Phelan | Dec. 6, 1927 |
| 1,681,157 | Eggleston | Aug. 14, 1928 |
| 1,768,625 | Olsen | July 1, 1930 |
| 2,070,108 | Bargeboer | Feb. 9, 1937 |
| 2,085,300 | Dillman | June 29, 1937 |
| 2,159,513 | Taylor | May 23, 1939 |
| 2,267,688 | Landon | Dec. 23, 1941 |